Dec. 1, 1931.  J. S. RICHARDSON  1,834,181
TURNING MACHINE
Filed Dec. 5, 1928  3 Sheets-Sheet 1

Inventor:
Jairus S. Richardson,
By Lindahl Parker Carlson
Attys.

Patented Dec. 1, 1931

1,834,181

UNITED STATES PATENT OFFICE

JAIRUS S. RICHARDSON, OF SHEBOYGAN FALLS, WISCONSIN, ASSIGNOR TO MATTISON MACHINE WORKS, OF ROCKFORD, ILLINOIS, A CORPORATION OF ILLINOIS

TURNING MACHINE

Application filed December 5, 1928. Serial No. 323,925.

The invention relates generally to turning machines such for example as are used for turning wood and more particularly has reference to a machine of this character embodying means for decreasing the idle time of the machine between the turning operations.

In prior machines of this character, considerable time is usually expended between each of the turning or cutting operations in the manual removal of a finished piece of work from the machine and the insertion of a new work piece therein. An object of the invention, therefore, is to provide means for presenting a piece of work in position to be properly engaged by the work spindle and for ejecting the work from the machine after the turning or cutting operation has been performed.

Another object of the invention is to provide a pair of spaced guide members arranged to receive a piece of work and to support the work in a definite position for engagement by the work spindle.

A further object of the invention resides in the provision of a means operable as the finished work piece is withdrawn from engagement with the cutter blades, to engage and eject the piece of work from the machine.

An object of the invention, therefore, is to provide a turning machine in which substantially all of the operations of removing and inserting a piece of work are automatically performed.

A more specific object, in connection with the previous object, is to provide work ejecting and work guiding means, the operations of which are in conjunction with the operations of an automatic tail stock.

Other objects and advantages will become apparent in the following description and in the accompanying drawings, in which.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

Figure 1:
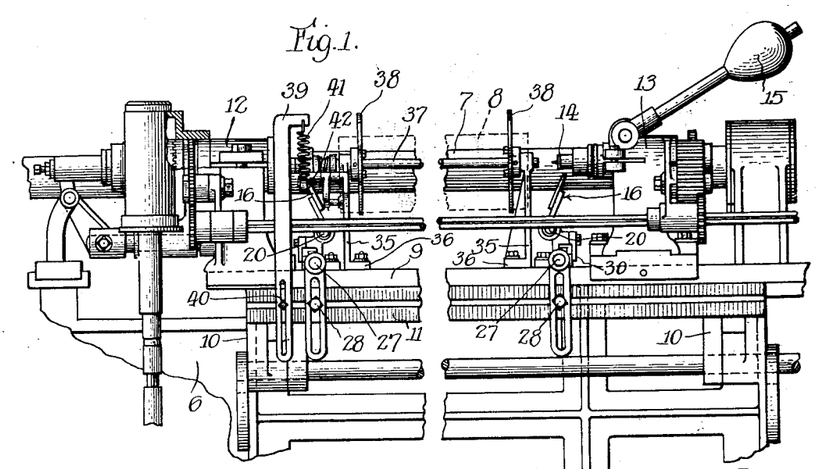
Figure 1 is a fragmentary front elevation of a turning machine showing the invention embodied therein.

The machine chosen for purposes of illustrating the work ejecting and presenting means is of the type which embodies a stationarily mounted rotating cutter head and a swingable work table movable to and from operative relation with the cutter. A main frame or base 6 is provided on which a cutter spindle 7 is rotatably mounted and carries a cutter 8, shown in dotted outline in the drawings (Fig. 1). The work, indicated herein as A, is supported upon a movable table 9 mounted for movement between an operative position adjacent the cutter 8 to an inoperative position remote from the cutter. The table 9 is carried on the upper end of an upright frame 10 having its lower end pivotally supported by suitable bearings (not shown) on the forward side of the base 6.

Suitable means may be provided for swinging the table toward and from the frame to move the work to and from the cutter which, since it forms no part of the present invention, has not been shown. A stationary supporting bar 11 extends longitudinally across the front of the frame and is spaced laterally therefrom beyond the remote inoperative position of the table.

Upon the table top are supported a headstock 12 and a tailstock 13 adapted in the embodiment shown in Fig. 1, for manual adjustment in a well known manner. The construction of the head and tailstocks includes spindles to which are secured suitable spur centers 14 between which a piece of work is held during operation thereon by the cutter. Manually operable means of a well known type are arranged for actuation as by the handle 15, to reciprocate the tailstock toward and from the headstock in order to clamp a piece of work therebetween or to release the work therefrom.

The present invention contemplates the provision of means operable to support a workpiece properly in position to be engaged by the spur centers in clamping the piece of work therebetween for presentation to the cutter. This means preferably is automatically movable to remote position, in which contact of the cutter with said means is impossible, as the table is moved to bring the piece of work into engagement with the cutter. In accomplishing these ends, a pair of spaced guide means, generally indicated at 16, are mounted in spaced relation longitudinally of the table 9 immediately underlying and in the vertical plane of the spur centers 14. Since each of the guide means 16 is substantially similar in construction, only one will be described in detail.

Figure 3:
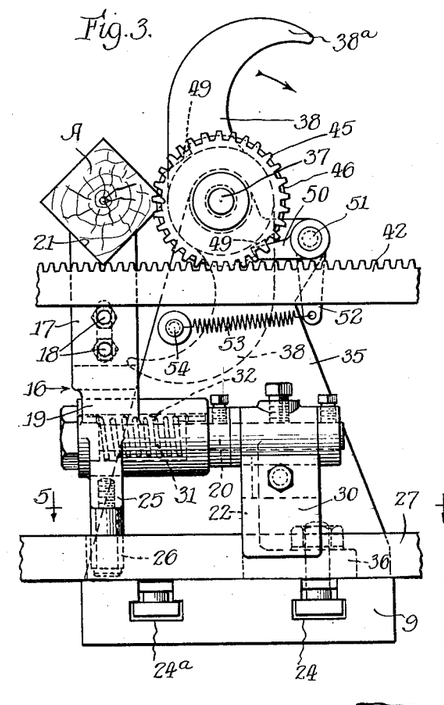
Fig. 3 is an enlarged end elevation showing details of construction of the work presenting and ejecting means.
Figure 4:
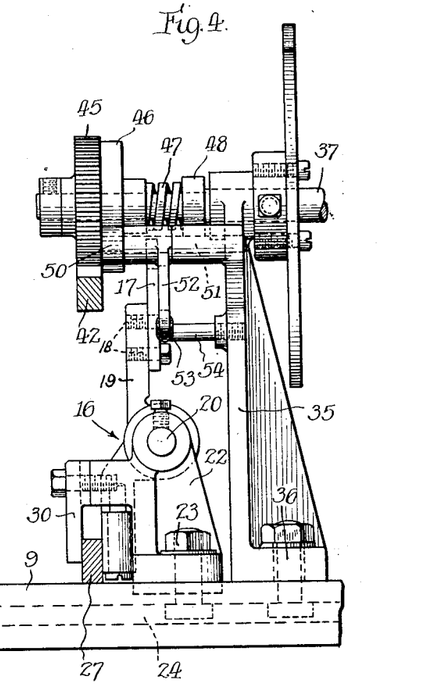
Fig. 4 is a front elevation of the details shown in Fig. 3.

Referring to Figs. 3 and 4, the guide means comprises a vertically extending plate 17 mounted for vertical adjustment, as by means of bolts 18, on a swinging bracket 19 journaled upon a shaft 20 for swinging movement in the vertical plane of the spur centers 14. The upper edge of the plate 17 is recessed, as at 21, to receive the piece of work A, the recess in the present instance being in the form of a V-shaped notch to receive an angular piece of work. The shaft 20 is supported upon the table 9 by suitable uprising standards 22 mounted for adjustment on the table, as by bolts 23 engaging a T slot 24 in the table.

Figure 5:
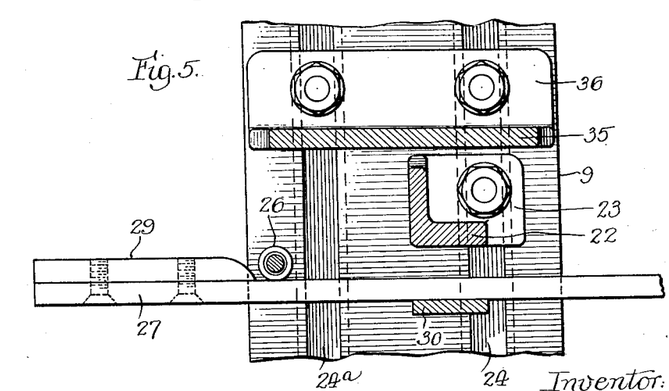
Fig. 5 is a section taken substantially on the lines 5—5 of Fig. 3 looking in the direction of the arrows.

The means by which movement of the guide means to an out of the way position relative to the cutter is attained comprises in the present instance a cam means connected to the guide members in such manner that, as the table is swung toward the cutter, the guides will be moved to their out of the way position. Thus, the bracket 19 carries a depending stud 25 provided at its lower end with a cam follower 26. A cam member 27 (Fig. 5) rigidly carried by the supporting arm 11, extends inwardly across the upper surface of the table 9 in a position adjacent the path of movement of the cam follower 26. Adjustment of the cam member may be obtained relative to the supporting bar 11 by means of a well known elongated slot and bolt connection 28. The cam member 27 carries means providing a cam surface 29 at its free end, which surface is arranged, upon engagement with the cam follower 26, to swing the bracket 19 and the plate 17 longitudinally of the bed of the machine to a position out of engagement with the piece of work and substantially underlying the spur centers.

Retaining means for the cam member 27, in the form of a depending flange 30 secured to the standard 22 for engagement with the back side of the cam member 27, prevents lateral movement of the cam member away from the cam follower during the movement of the cam follower relative to the table. Suitable resilient means maintains the engagement of the cam follower with the cam member and surface thereon and returns the guide members to their work supporting position after the cam surface 29 has moved out of engagement with the cam follower 26. The preferred construction of this means is shown in Fig. 3 and comprises a helical spring 31 mounted about the shaft 20 in a recess 32 in the bearing of the bracket 19, and bearing, on the one hand, against the bracket and, on the other hand, against a stationary part of the shaft mounting.

By this construction, it will be seen that, when the table is in its remote position from the cutter, the cam followers 26 will be out of engagement with the cam surfaces 29 to permit the springs 31 to hold the guide members 16 in their upright work supporting position. While the work is supported in this position, the spur centers 14 on the tailstock may be moved by the operating handle 15 to approach the work center on the headstock thereby clamping the workpiece in operative position therebetween. Thence as the work table is swung toward the frame to bring the piece of work into engagement by the cutter, the relative movement of the table and the cam member 27 brings the cam followers 26 into engagement with the cam surfaces 29 to rock the guide members 16 about the shafts 20 thereby moving the guide members out of engagement with the piece of work into a position remote from possible engagement by the cutter.

The preferred form of the means by which the finished piece of work is ejected from a machine after the completion of the cutting operation comprises in the present embodiment, a work engaging member operable, by the swinging movement of the table away from the frame, to engage the work as it is released from its clamped position between the head and tailstock centers, and carry the work into a position to fall by gravity into a suitable receptacle (not shown). As may be seen in Figs. 1, 3 and 4, a pair of upright standards 35 are mounted in longitudinally spaced relation upon the table 9 for relative adjustment, as by means of the bolts 36 engaging the T-slots 24 and 24ª in the table. A shaft 37 is suitably journaled in the upper ends of the brackets 35 to extend longitudinally of the machine substantially in the horizontal plane designated by the spur centers 14. The shaft 37 carries a pair of spaced ejectors 38 mounted for rotation with the shaft and positioned thereon between and adjacent the brackets 35. The ejectors are similar in form and, in the preferred embodiment shown in Fig. 3, each comprises a substantially S-shaped member mounted centrally on the shaft 37 to provide a pair of diametrically opposed plates 38ᵃ curved in the direction of rotation, as indicated by the arrow in Fig. 3. The arms 38ᵃ on the ejectors are alined and are of sufficient length to insure, during the rotation thereof, that a piece of work positioned between the spur centers will be engaged by the arms.

Figure 2:
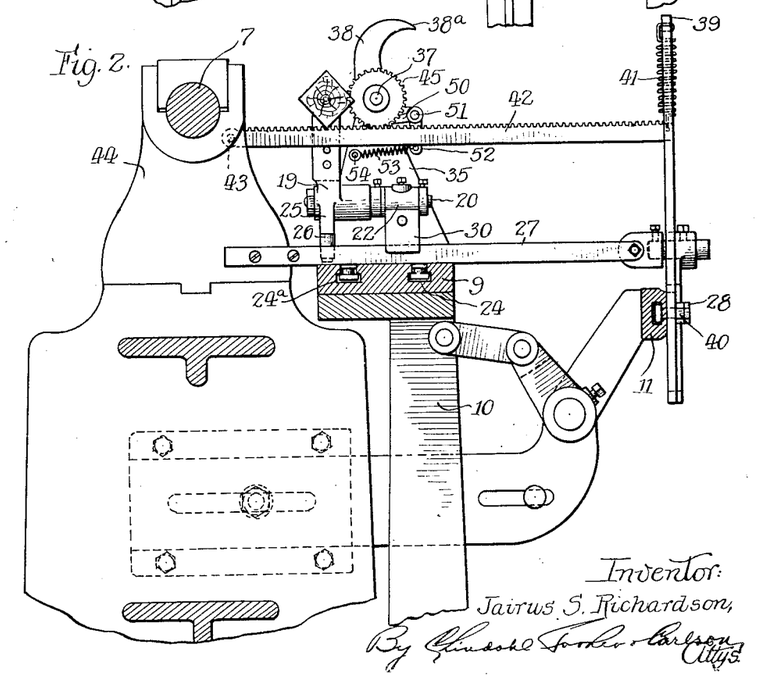
Fig. 2 is an enlarged fragmentary end view showing the work presenting and work ejecting means.

The rotation of the shaft 37, by which an engagement of the ejector arms with the work to move the work out of the machine is effected, may preferably be produced during the movement of the table to its remote position in the following manner. An upright arm 39 is rigidly mounted upon the supporting bar 11 at a point immediately in front of the one end of the shaft 37. The bar 39 is preferably capable of adjustment upon the supporting bar as by means of the elongated slot and bolt connection 40, and supports, at its upper end, a depending helically coiled spring 41. A rack bar 42 (Fig. 2) is pivotally mounted, as at 43, at one end upon a stationary portion of the machine, such as the supporting member 44 for the cutter spindle 7, and extends forwardly therefrom, underlying the end of the shaft 37, to be supported at its outer end by the lower end of the spring 41. A pinion 45 loosely mounted upon the shaft 37 is arranged to engage the rack 42.

The shaft 37 is driven by the rotation of the pinion which is induced by relative movement between the pinion and rack and, since it is preferred that the ejectors be rotated only in one direction, the driving connection between the pinion and the shaft includes a suitable ratchet mechanism. As illustrated (Figs. 3 and 4) this driving connection comprises a ratchet disk 46 splined or otherwise suitably mounted for longitudinal movement on the shaft 37, and positioned thereon with one face abutting one of the faces of the pinion 45. A spring 47, bearing between a shoulder 48 on the shaft 37 and a hub portion of the ratchet 46, exerts a force normally ample to hold the abutting faces of the ratchet and the pinion in frictional engagement. The peripheral surface of the ratchet disk is provided with a pair of diametrically opposed notches 49 (Fig. 3), which are adapted to be engaged by a pawl 50 pivotally mounted upon a pin 51 journalled in the bracket 35. The pawl carries a depending arm 52, and a suitable contractile spring 53 connected at one end to the depending arm 52 and at the other end to a stud 54 on the bracket 35 exerts a force to hold the pawl 50 in contact with the peripheral surface of the ratchet.

By this construction, as the table is swung toward its remote position to remove the work from the cutters, the engagement of the pinion which is carried by the table with the rack, which is stationary with the frame, rotates the pinion. This, through the frictional engagement of the pinion with the ratchet disk, rotates the shaft 37 to move similar ejecting arms 38ᵃ into engagement with the work thereby removing the work from the machine. A movement of the table in the return direction rotates the shaft 37 only until one of the notches 49 on the ratchet disk moves into engagement with the pawl 50. This engagement stops the rotation of the ratchet disk 46 and shaft 37, further rotation of the pinion being permitted by the slipping of the frictional engagement between the pinion and the ratchet. The disposition of the notches 49 on the ratchet is such that the pawl is engaged thereby only when the arms of the ejector occupy a vertical position relative to the work table. This prevents the arms from accidentally projecting into the position normally occupied by the workpiece.

The operation of the device as herein described is exceedingly simple. Considering that the work table 9 is in its remote position from the frame 6 and that the tailstock has been retracted from the headstock, the guide members 16 are in their upright position. The operator, by merely placing a piece of work upon the guide members, may then clamp the work properly alined between the spur centers by moving the tailstock toward the headstock by the handle 15. This clamping action may occur during the first part of the movement of the table toward the frame. Near the end of this movement the engagement of the cam surfaces 29 with the followers 26 on the guide members swings the guide members to their remote positions, after which the cutter blades engage and operate upon the workpiece. Simultaneously as the table moves toward the frame the pawl 50 has engaged the ratchet disk to hold the ejectors in their remote vertical or inoperative position.

At the completion of the working operation, the table is swung away from the frame and the engagement of the pinion 45 with the rack 42 rotates the shaft 37 to bring the lower arms of the ejectors 38 into engagement with the work piece. Substantially at this time, the operator retracts the tailstock to release the piece of work, and continued movement of the table rotates the ejectors to carry the piece of work to a position to be deposited by gravity into a receiving bin.

During these latter movements, the cam surfaces 29 have moved from the followers 26 to permit the springs 31 to return the guide members 16 to the vertical position to receive a new piece of work.

Figure 6:
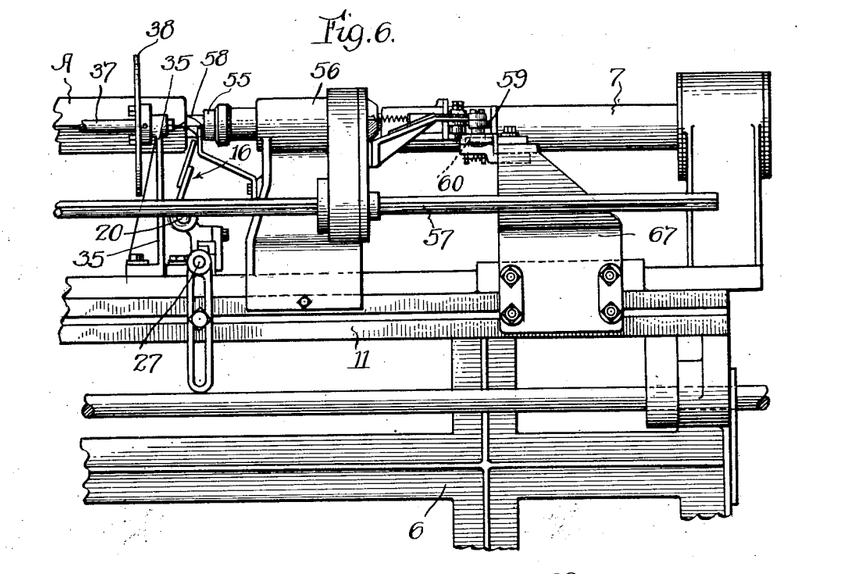
Fig. 6 is a fragmentary front elevation of a turning machine embodying an automatic tail stock as used in connection with the work ejecting and presenting means.
Figure 7:
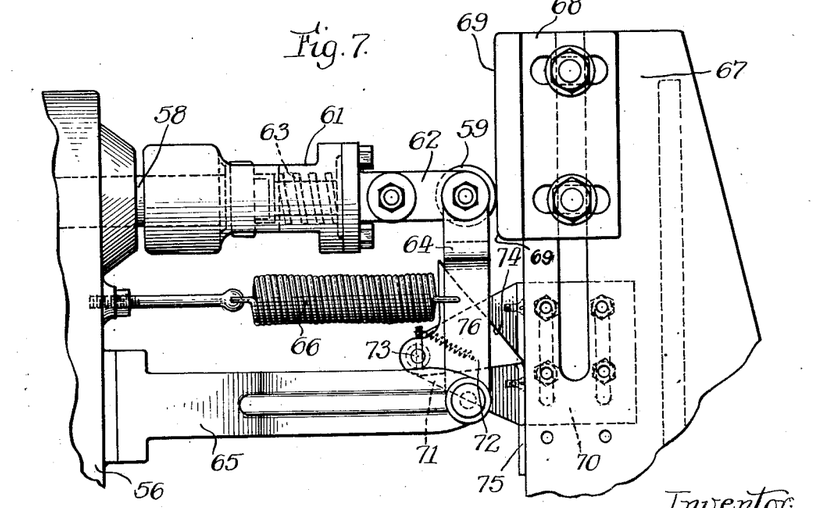
Fig. 7 is an enlarged fragmentary plan view of the actuating mechanism for the automatic tail stock shown in Fig. 6.

Referring now to Figs. 6 and 7, the combination of the work ejector and the work presenting means with an automatically operable tailstock spindle is shown. In a combination of this character the several parts are correlated in their respective operations in such manner that, as the tailstock spindle is automatically retracted, by a relative swinging movement of the frames, to release a piece of work, the work ejector moves into operative engagement and discharges the work from the machine.

During substantially the same movement of the frames, the work presenting means assume their upright, work-presenting position to receive a new piece of work from the operator. The new piece of work is held in this position until a further relative movement of the frames causes the tailstock spindle to return to its work engaging position, thus operatively engaging the new work piece, after which a relative return movement of the frames to the adjacent operative position thereof returns the work ejector and presenting means to their inoperative position.

While it is contemplated that various arrangements of automatically operated tailstocks may be employed in connection with ejecting and presenting means, the construction which has been chosen for illustrative purposes is that shown and more completely described in a copending application, Serial No. 324,831, filed December 10th, 1928, by Carl Lawrence Mattison.

More particularly describing the automatic tailstock, a spindle 55 is mounted for rotation and limited axial movement in a tailstock housing 56. The spindle in this instance is suitably driven from a shaft 57 through the agency of gears (not shown) within the housing; splined connections of the usual type being used to permit axial adjustment of the tailstock housing relative to the shaft 57, and movement of the spindle 55 relative to the driving gears.

The inner end of the spindle 55 carries a suitable center 58 to engage the work piece A while the other or outer end of the spindle extends through and beyond the housing 56 and carries a pair of vertically disposed cam followers 59, 60 thereon. Interposed between the cam followers and the spindle is a collar 61 slidable on the spindle and connected to the cam followers by a pivoted link 62. The collar 61 is preferably in the form of a housing within which is a spring and thrust bearing arrangement 63 (Fig. 7) arranged to exert tension for forcing the spindle inwardly when the collar is moved inwardly by a force acting through the upper cam 69 and cam follower 59.

The vertical disposition of the cam followers is maintained by a second link 64 pivotally secured at one end thereto and at the other end to a stationary bracket 65, extending from the housing 56. A helical contractile spring 66 connecting the housing 56 and the second link 64 exerts a force tending to hold the spindle inwardly of the housing in work engaging position. The strength of this spring 66, however, is insufficient to actuate the spring and thrust bearing arrangement 63.

The cams for effecting the operative movement of the spindle are carried upon an overhanging bracket or overarm 67 which is supported by a stationary part of the machine, as, for example, the stationary supporting bar 11. Thus, the rear end of the overarm 67 carries a cam member 68 adjustably mounted to present a cam surface 69 for engagement by the cam follower 59 when the swinging frame approximates or is in its operative position adjacent the stationary frame. The cam surface is shaped and positioned to impart a relatively short inward movement to the cam follower 59 which is transferred to the spindle 55 by actuation of the spring and thrust bearing arrangement 63 thereby forcing the spindle into a positive clamped engagement with the work during the cutting operation.

Mounted forwardly of the cam 68 upon the overarm 67 is a bracket 70 having a portion 71 extending inwardly of the machine from the overarm. This portion 71 has a flat upper surface upon which a triangularly shaped cam member 72 is pivotally mounted, as at 73, for swinging movement in a horizontal plane. The cam 72 has a cam surface 74 positioned in the path of the lower cam follower 60, which surface slopes in an inner-rear to forward-front direction. The cam is held stationary during engagement with the cam follower 60, as the swinging frame is drawn to carry the work from the cutters, by means of an abutment with the end of a flat plate 75 uprising from the overarm 67. The plate 75 is formed to constitute, when abutted by the cam 72, a continuation of the cam surface 74 thus providing a dwell surface capable of maintaining the spindle in the retracted position to which it has been moved by the cam surface 74 during the forward swinging movement of the frame.

It will be seen that the retracting movement of the spindle by the cam surface 74 will be resisted by the spring 66 which holds the cam follower 60 in close engagement with the cam 72 and subsequently with the flat surface 75. Consequently, the spring 66 operates to return the spindle into a work engaging position as soon as the cam follower 60 has been moved out of engagement with the flat plate 75 by a further movement of the swinging frame. During the return movement of the frames toward the adjacent operative position the cam follower 60 will engage the rear surface of the cam 72 which engagement, since the cam is pivoted, swings the cam out of the way and permits the cam follower to move past the cam to its original position. The cam 72 is returned to its abutting engagement with the plate 75 in any suitable manner, as by means of the helically coiled spring 76. The final movement of the swinging frames into operative position, as has been mentioned, brings the cam follower 59 against the cam surface 69 to induce the final clamping action upon the spindle.

The cam 68 and the cam bracket 70 are mounted for adjustment upon the overarm 67 in order to permit the operative movements of the spindle to be synchronized with the operative movements of the ejector means and the work presenting means. Preferably the movements of the three parts are adjusted to operate in the following manner. As the swinging frame is moved forwardly after a cutting operation has been completed the cam follower 59 moves from the cam surface 69 to release the clamping engagement of the spindle with a piece of work. Further movement of the swinging frame brings the cam follower 60 against the cam surface 74 to retract the spindle entirely from engagement with the piece of work. During this movement of the frame, the ejector arms have rotated from their vertical out-of-the-way position to a position underlying the work piece, and as the spindle releases the work piece, the ejector means receives it for ejection from the machine. Further forward movement of the frame effects this ejection and also moves the cam follower 60 onto the dwell surface provided by the flat plate 75.

The forward movement of the frame up to this point has also moved the work presenting and guiding means from their out-of-the-way position to their work presenting position underlying the work spindles. Hence if the forward movement of the frames is stopped with the cam surface 60 engaging the plate 75 to hold the work spindle in retracted position, the operator may place a new piece of work upon the work presenting means. This having been done, a further movement of the frame forwardly moves the cam follower 60 from the plate 75 and allows the spring 66 to pull the tailstock spindle into holding engagement with the piece of work presented thereto. The operator then reverses the movement of the swinging frame and moves the piece of work into its clamped operative position during which movement the ejector means and the work presenting means are returned to their idle, out-of-the-way positions.

It will be apparent from the foregoing that a new and improved means has been provided in a turning machine of this character by which the operator is enabled to remove a finished piece of work and to insert a new piece with a minimum of time and effort, thereby decreasing materially the idle time of the machine.

I claim as my invention:

1. A turning machine comprising, in combination, a frame having a cutter mounted thereon, a second frame having work supporting means thereon, one of said frames being movable to and from an operating position adjacent the other frame, means pivoted on said second frame for presenting a piece of work to be engaged by said work supporting means, said means being mounted for lateral swinging movement in a vertical plane traversing the line of travel of the movable frames to and from a work presenting position, means interposed between said first frame and said work presenting means for effecting such movement during the relative movement of the frames, an ejector carried by said second frame for removing a piece of work from the work supporting means, and a second operating means interposed between said first frame and said ejector means for moving the ejector means into work engaging position and subsequently ejecting the work during the relative movement of said frames toward the inoperative position thereof.

2. A turning machine comprising, in combination, a first frame having a cutter mounted thereon, a second frame having means thereon for supporting a work piece, one of said frames being movable to and from an operating position adjacent the other frame, arms pivotally supported on said work supporting frame capable of receiving and presenting a piece of work in position to be engaged by said work supporting means, said arms being mounted for movement on an axis extending transversely of said frame, means operatively engageable by said work presenting arms for swinging said arms to an out of the way position as said frames move toward an operative position, means movable into engagement with the workpiece to eject said workpiece from the machine, and actuating means connected to said work ejecting means operable as said frame moves from its operating position.

3. A turning machine comprising, in combination, a cutter supporting frame, a work supporting frame including work supporting means thereon movable to and from said cutter supporting frame to carry the work into and out of an operating position, and means for ejecting the work from said work supporting means comprising a shaft having means thereon rotatable into engagement with a piece of work carried by said work supporting means, and means actuated by the relative movement of said frames for rotating said shaft including a rack stationary with respect to the cutter supporting frame and a pinion on said shaft engaging said rack.

4. A turning machine comprising, in combination, a cutter supporting frame, a work supporting frame including work supporting means thereon movable to and from said cutter supporting frame to carry the work into and out of an operating position, and means for ejecting the work from said work supporting means comprising a shaft having means thereon rotatable into engagement with a piece of work carried by said work supporting means, and means actuated by the relative movement of the frames for rotating said shaft in a work ejecting direction including a stationary rack and a pinion associated therewith connecting said shaft and said cutter supporting frame and a ratchet device for holding said shaft against rotation in the other direction.

5. A machine of the character described comprising, in combination, a shiftable work-supporting carriage, and work-ejecting means operated by the movement of said carriage and comprising a rotatable ejector on the carriage, a stationary rack bar, and a pinion mounted on said carriage and arranged to mesh with said rack bar and to actuate said ejector.

6. A turning machine comprising, in combination, a stationary base frame having a cutter mounted thereon, a second frame mounted adjacent said base frame for movement to and from an operating position relative thereto, work supporting means on said second frame movable into and out of an engaging position with a piece of work, means automatically operable to withdraw said work supporting means to an out of engagement position during movement of said second frame from the base frame, ejector means on said second frame for removing a piece of work from the machine also operated by the same movement of said frame to engage and remove the piece of work upon release thereof by the withdrawal of said work supporting means, guide means for presenting a blank piece of work to the work supporting means movable into operative position by the same movement of said frame and means actuated by a further movement of said frame for returning said work supporting means into the work engaging position thereof to engage a new piece of work presented by the guiding means.

7. A turning machine comprising, in combination, a first frame having a cutter mounted thereon, a second frame, one of said frames being movable to and from an operative position adjacent the other of said frames, work supporting means on said second frame for presenting a piece of work to the cutter in the adjacent position of said frames, said work supporting means being movable into and out of position to engage a piece of work, work ejecting means mounted on said second frame for ejecting a piece of work from the machine, work presenting means movable into and out of position guidingly to present a new piece of work for engagement by said work supporting means, means effective during the relative movement of said two frames from the adjacent position thereof to withdraw said work supporting means from the engagement thereof with a piece of work, means effective during further movement of said frame to move said work ejecting means into ejecting engagement with the work, and means operable during the same movement of the frames to move said work presenting means from the remote position thereof into its operative position relative to the work supporting means.

8. A turning machine comprising, in combination, a first frame having a cutter mounted thereon, a second frame, one of said frames being movable to and from an operative position adjacent the other of said frames, work supporting means on said second frame for presenting a piece of work to the cutter in the adjacent position of said frames, said work supporting means being movable into and out of position to engage a piece of work, work ejecting means mounted on said second frame for ejecting a piece of work from the machine, work presenting means movable into and out of position guidingly to present a new piece of work for engagement by said work supporting means, means effective during the relative movement of said two frames from the adjacent position to withdraw said work supporting means from the engagement thereof with a piece of work, means effective during further movement of said frame to move said work ejecting means into ejecting engagement with the work, means operable to move said work presenting means into operative position relative to said work supporting means during said movement of said two frames, and means for returning said work supporting means into the work engaging position thereof upon a further relative movement of said two frames.

9. A turning machine comprising, in combination, a first frame having a cutter mounted thereon, a second frame, one of said frames being movable to and from an operative position adjacent the other of said frames, work supporting means on said second frame for presenting a piece of work to the cutter in the adjacent position of said frames, said work supporting means being movable into and out of position to engage a piece of work, work ejecting means mounted on said second frame for ejecting a piece of work from the machine, work presenting means movable into and out of position guidingly to present a new piece of work for engagement by said work supporting means, means effective during the relative movement of said two frames from the adjacent position thereof to withdraw said work supporting means from the engagement thereof with a piece of work, means effective during further movement of said frame to move said work ejecting means into operating engagement with the work, means operable to move said work presenting means into operative position relative to said work supporting means during said movement of said two frames, means for returning said work supporting means into the work engaging position thereof upon a further relative movement of said two frames, and other means effective to return said work ejecting and presenting means to the original position thereof during relative movement of said two frames to the adjacent position.

10. A turning machine comprising, in combination, a first frame having a cutter mounted thereon, a second frame having means thereon for supporting a work piece, said means being movable to engage or release said work piece, one of said frames being movable to and from an operating position adjacent the other frame, means on said work supporting frame movable into and out of position to present a piece of work for engagement by said work supporting means, means effective during the relative movement of said two frames to move said work supporting means to the disengaged position thereof, means operable during the same movement of said frames to move said work presenting means into the work presenting position thereof, and means operable upon a further relative movement of said two frames to move said work supporting means into position to engage a piece of work presented thereto by said work presenting means.

11. A machine of the character described comprising, in combination, a shiftable carriage having work-supporting means thereon, a work-ejecting means, a work-presenting means, and mechanism operable during the shifting movement of said carriage in one direction successively to release a piece of work from said work-supporting means, to eject said piece of work, to move said work-presenting means into operative position to present a piece of work for engagement by said work-supporting means and finally to move said work-supporting means into engagement with the piece of work.

12. In a turning machine having a frame with a cutter thereon and a second frame having work-supporting means thereon, one of said frames being movable to and from an operating position adjacent the other frame, the combination of means for holding a piece of work in position to be engaged by said work supports comprising a pair of spaced members pivotally mounted in spaced relation on said second frame underlying said work-supporting means for swinging movement substantially in a vertical plane which includes said work-supporting means, said members having upwardly opening recesses therein to receive a piece of work for presentation thereof to said work-supporting means, and means connected to said members operable as said frames are moved toward their operating positions to swing said members outwardly beyond the ends of the work and downwardly in said vertical plane of swinging movement.

13. In a turning machine having a frame with a cutter mounted thereon and a second frame having work-supporting means thereon, one of said frames being movable to and away from an operating position adjacent the other frame, ejector means rotatable from a normal out of the way position into engagement with a piece of work held by said work-supporting means to eject said piece of work from the machine, mechanism operable by the relative movement of said frames to rotate said ejector means, and means associated with said mechanism operable to permit reverse rotation of said ejector means to its normal position and then to prevent further reverse rotation thereof.

14. In a turning machine having a frame with a cutter mounted thereon and a second frame having work-supporting means thereon, one of said frames being movable to and away from an operating position adjacent the other frame, ejector means rotatable from a normal out of the way position into engagement with a piece of work held by said work-supporting means to eject said piece of work from the machine, a rotary member carried by said ejector means, means engaging said rotary member for producing rotational movement thereof when said frames are moved relatively, and a ratchet connection interposed between said rotary member and said ejector means for preventing rotation of said ejector means in one direction after said ejector means has reached the normal position thereof.

15. In a turning machine having a frame with a cutter mounted thereon and a second frame having work-supporting means thereon, one of said frames being movable to and away from an operating position adjacent the other frame, a shaft rotatably journalled on said second frame adjacent the work-supporting means, radial arms rotatable with said shaft from a normal out of the way position into engagement with a piece of work held by said work-supporting means to eject said piece of work from the machine, a rotatable toothed member on said shaft, means on said cutter frame for engaging and imparting rotary movement to said toothed member as said frames are moved relatively, and a ratchet device connecting said shaft and toothed member for preventing rotation of said shaft as said frames move relatively in one direction when said arms are in said normal position.

16. In a turning machine having a frame with a cutter mounted thereon and a second frame having work-supporting means thereon, one of said frames being movable to and away from an operating position adjacent the other frame, a shaft rotatably journalled on said second frame adjacent the work-supporting means, radial arms rotatable with said shaft into engagement with a piece of work held by said work-supporting means to eject said piece of work from the machine, a rack pivoted on said cutter frame, a pinion on said shaft engaging said rack, resilient means for maintaining the engagement between said rack and pinion, and a ratchet device connecting said shaft and pinion for preventing rotation of said shaft in one direction.

17. In a machine of the character described comprising, in combination, a shiftable work supporting carriage and work ejecting means operated by the movement of said carriage and comprising a rotatable ejector on the carriage, a toothed member connected with said ejector, and means engaging said toothed member and movable relative thereto as said carriage is shifted for imparting rotative movement to said toothed member.

In testimony whereof, I have hereunto affixed my signature.

JAIRUS S. RICHARDSON.